(12) United States Patent
Wang et al.

(10) Patent No.: US 9,577,514 B2
(45) Date of Patent: Feb. 21, 2017

(54) PEAK SAMPLE CIRCUIT FOR AC VOLTAGE AND METHOD THEREOF

(71) Applicant: Chengdu Monolithic Power Systems Co., Ltd., Chengdu (CN)

(72) Inventors: Siran Wang, Hangzhou (CN); Yike Li, Chengdu (CN); Kun Yi, Chengdu (CN); Yuancheng Ren, Hangzhou (CN); Junming Zhang, Hangzhou (CN); En Li, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 212 days.

(21) Appl. No.: 14/327,219

(22) Filed: Jul. 9, 2014

(65) Prior Publication Data

US 2015/0016154 A1 Jan. 15, 2015

(30) Foreign Application Priority Data

Jul. 10, 2013 (CN) .......................... 2013 1 0289057

(51) Int. Cl.
  *H02M 5/45* (2006.01)
  *H02M 1/42* (2007.01)

(52) U.S. Cl.
  CPC ........... *H02M 1/4258* (2013.01); *Y02B 70/126* (2013.01)

(58) Field of Classification Search
  CPC .......................................... H02M 1/4258
  USPC .......................................... 363/89, 123–127
  See application file for complete search history.

(56) References Cited

U.S. PATENT DOCUMENTS

| | | | | |
|---|---|---|---|---|
| 3,268,824 A * | 8/1966 | Hinrichs | ................. | H04L 25/06 327/156 |
| 4,104,691 A * | 8/1978 | Shimp | .................... | H02H 3/093 361/110 |
| 4,297,741 A * | 10/1981 | Howell | .................... | H02H 3/44 361/93.5 |
| 6,160,884 A * | 12/2000 | Davis | .................... | H04M 1/654 379/373.01 |
| 6,400,095 B1 * | 6/2002 | Primisser | ........... | H05B 41/2985 315/121 |
| 8,575,881 B2 * | 11/2013 | Hiltbold | .................... | H02P 1/42 318/438 |
| 8,743,577 B2 * | 6/2014 | Cheng | .................... | H02M 7/217 327/538 |
| 2007/0217237 A1 * | 9/2007 | Salvestrini | ............. | H05B 39/08 363/125 |
| 2009/0316454 A1 * | 12/2009 | Colbeck | .............. | H02M 1/4225 363/89 |
| 2010/0123447 A1 * | 5/2010 | Vecera | .................... | H02M 1/32 323/290 |

(Continued)

*Primary Examiner* — Adolf Berhane
*Assistant Examiner* — Nusrat Quddus

(57) ABSTRACT

A peak sample circuit for AC voltage, including: a rectifier coupled to receive an AC voltage and to rectify the AC voltage to generate a rectified signal; a delay circuit coupled to receive the rectified signal and to delay the rectified signal to generate a delayed rectified signal; a comparison circuit coupled to receive the delayed rectified signal and to generate a square signal based on the comparison of the rectified signal and the delayed rectified signal; and a sample output circuit coupled to receive the rectified signal, wherein the sample output circuit samples the rectified signal under the control of the square signal and provides a peak sample signal representative of the peak value of the AC voltage.

17 Claims, 8 Drawing Sheets

(56) References Cited

U.S. PATENT DOCUMENTS

2014/0153301 A1 6/2014 Wang et al.

* cited by examiner

US 9,577,514 B2

PEAK SAMPLE CIRCUIT FOR AC VOLTAGE AND METHOD THEREOF

CROSS-REFERENCE TO RELATED APPLICATION(S)

This application claims the benefit of CN application 201310289057.3, filed on Jul. 10, 2013, and incorporated herein by reference.

TECHNICAL FIELD

The present invention generally relates to electronic circuits, and more particularly but not exclusively to peak sample circuits and peak sample methods for AC voltage and switching converters using the peak sample circuit.

BACKGROUND

Peak sampling of an AC voltage is usually implemented in digital way, which requires memories for data storage and digital processors for signal processing. If there is no digital element in the system, peak sampling is usually implemented by a diode and a capacitor. However, this simple solution is not accurate especially when the peak value of the AC voltage varies cycle by cycle.

SUMMARY

Embodiments of the present invention are directed to a peak sample circuit for AC voltage, wherein the peak sample circuit comprises a rectifier, a delay circuit, a comparison circuit and a sample output circuit. The rectifier is configured to receive an AC voltage, and to provide a rectified signal by rectifying the AC voltage. The delay circuit is configured to provide a delayed rectified signal by delaying the rectified signal. The comparison circuit is configured to generate a square signal based on the comparison of the rectified signal and the delayed rectified signal. The sample output circuit is configured to sample the rectified signal at peak sampling instant determined by the square signal, and to generate a peak sample signal representative of the peak value of the AC voltage.

Embodiments of the present invention are also directed to a peak sample method for AC voltage, wherein the peak sample method comprises: rectifying an AC voltage to a rectified signal; generating a delayed rectified signal by delaying the rectified signal; generating a square signal based on the comparison of the rectified signal and the delayed rectified signal; and determining a sampling instant based on the square signal and sampling the rectified signal at the sampling instant to provide a peak sample signal representative of the peak value of the AC voltage.

BRIEF DESCRIPTION OF THE DRAWINGS

Non-limiting and non-exhaustive embodiments are described with reference to the following drawings. The drawings are only for illustration purpose. These drawings are not necessarily drawn to scale. The relative sizes of elements illustrated by the drawings may differ from the relative size depicted.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
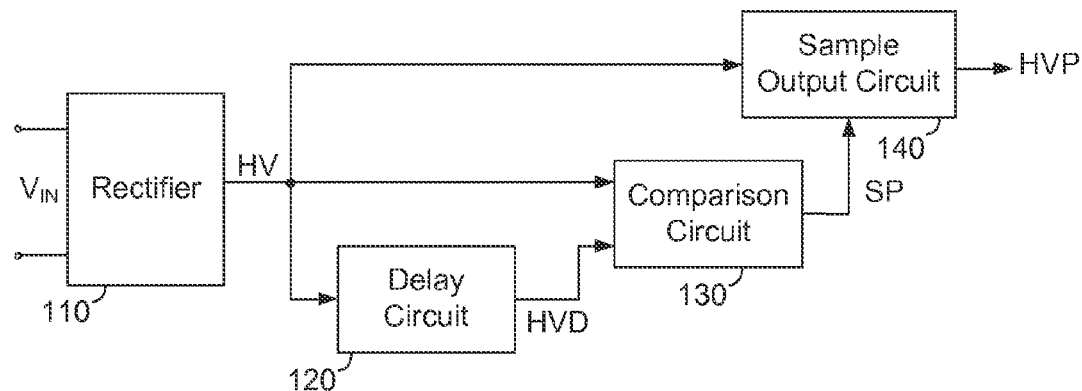
FIG. 1 is a schematic block diagram of a peak sample circuit for AC voltage in accordance with an embodiment of the present invention.

FIG. 1 is a schematic block diagram of a peak sample circuit for AC voltage in accordance with an embodiment of the present invention. The peak sample circuit comprises a rectifier 110, a delay circuit 120, a comparison circuit 130 and a sample output circuit 140.

The rectifier 110 has a first input terminal, a second input terminal and an output terminal, wherein the first input terminal and the second input terminal are coupled to an AC source to receive an AC voltage $V_{IN}$. The rectifier 110 is configured to rectify the AC voltage $V_{IN}$ and to provide a rectified signal HV at the output terminal. In one embodiment, the frequency of the AC voltage $V_{IN}$ is either 50 Hz or 60 Hz. In another embodiment, the AC voltage $V_{IN}$ may have a wide input range, such as 85 VAC~265 VAC. The rectifier 110 may be configured in any known rectifier topology, such as a full-bridge rectifier, a full-wave rectifier, a half-wave rectifier and so on.

The delay circuit 120 has an input terminal and an output terminal, wherein the input terminal is coupled to the output terminal of the rectifier 110 to receive the rectified signal HV. The delay circuit 120 is configured to delay the rectified signal HV, and to provide a delayed rectified signal HVD at the output terminal. The delay circuit 120 may be any circuit with delay function.

The comparison circuit 130 has a first input terminal, a second input terminal and an output terminal, wherein the first input terminal is coupled to the output terminal of the rectifier 110 to receive the rectified signal HV, the second input terminal is coupled to the output terminal of the delay circuit 120 to receive the delayed rectified signal HVD. The comparison circuit 130 is configured to generate a square signal SP at the output terminal based on the comparison of the rectified signal HV and the delayed rectified signal HVD.

The sample output circuit 140 has an input terminal, a control terminal and an output terminal, wherein the input terminal is coupled to the output terminal of the rectifier 110 to receive the rectified signal HV, the control terminal is coupled to the output terminal of the comparison circuit 130 to receive the square signal SP. The sample output circuit 140 is configured to determine a peak sampling instant based on the square signal SP, and to sample the rectified signal HV at the peak sampling instant to provide a peak sample signal HVP representative of the peak value of the AC voltage $V_{IN}$.

Figure 2:
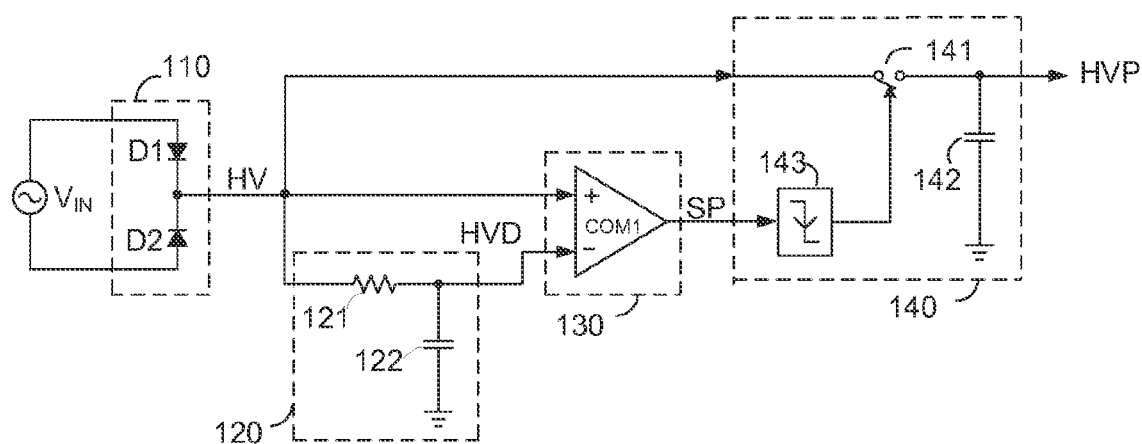
FIG. 2 illustrates a schematic circuit diagram of a peak sample circuit for AC voltage in accordance with an embodiment of the present invention.

FIG. 2 illustrates a schematic circuit diagram of a peak sample circuit for AC voltage in accordance with an embodiment of the present invention. The peak sample circuit comprises a rectifier 110, a delay circuit 120, a comparison circuit 130 and a sample output circuit 140. In the embodiment shown in FIG. 2, the rectifier 110 comprises diodes D1 and D2. The anodes of the two diodes D1 and D2 are respectively coupled to the two input terminals of an AC source, and the cathodes of the two diodes D1 and D2 are coupled together to provide a rectified signal HV.

The delay circuit 120 comprises a delay resistor 121 and a delay capacitor 122. The delay resistor 121 has a first terminal and a second terminal, wherein the first terminal is coupled to the output terminal of the rectifier 110 to receive the rectified signal HV. The delay capacitor 122 has a first terminal and a second terminal, wherein the first terminal is coupled to the second terminal of the delay resistor 121, the second terminal is coupled to ground. The resistance of the delay resistor 121 and the capacitance of the delay capacitor 122 may be properly selected to provide a required delay time T_delay.

The comparison circuit 130 comprises a comparator COM1. The comparator COM1 has a non-inverting input terminal, an inverting input terminal and an output terminal, wherein the non-inverting input terminal is coupled to the output terminal of the rectifier 110 to receive the rectified signal HV, the inverting terminal is coupled to the output terminal of the delay circuit 120 to receive the delayed rectified signal HVD. The comparator COM1 is configured to generate the square signal SP at the output terminal based on the comparison of the rectified signal HV and the delayed rectified signal HVD. In the embodiment shown in FIG. 2, when the rectified signal HV is larger than the delayed rectified signal HVD, the square signal SP is at high level; when the rectified signal HV is smaller than the delayed rectified signal HVD, the square signal SP is at low level.

The sample output circuit 140 may be configured in any known sampling circuit. In the embodiment shown in FIG. 2, the sample output circuit 140 comprises an output switch 141 and an output capacitor 142. The output switch 141 has a first terminal, a second terminal and a control terminal, wherein the first terminal is coupled to the output terminal of the rectifier 110 to receive the rectified signal HV. The output capacitor 142 has a first terminal and a second terminal, wherein the first terminal is coupled to the second terminal of the output switch 141, the second terminal is coupled to ground. In an embodiment, the sample output circuit 140 further comprises a falling-edge triggered circuit 143. The falling-edge triggered circuit 143 has an input terminal and an output terminal, wherein the input terminal is coupled to the output terminal of the comparison circuit 130 to receive the square signal SP, the output terminal is coupled to the control terminal of the output switch 141.

In the embodiment shown in FIG. 2, the peak sampling instant is at every falling edge of the square signal SR. The sample output circuit 140 samples the rectified signal HV at the peak sampling instant and provides the peak sample signal HVP at the first terminal of the output capacitor 142.

In an embodiment, the peak sample circuit for AC voltage further comprises a voltage divider. The voltage divider is coupled to the output terminal of the rectifier 110 to divide the rectified signal HV and provides the divided rectified signal to the delay circuit 120, the comparison circuit 130 and the sample output circuit 140.

Figure 3:
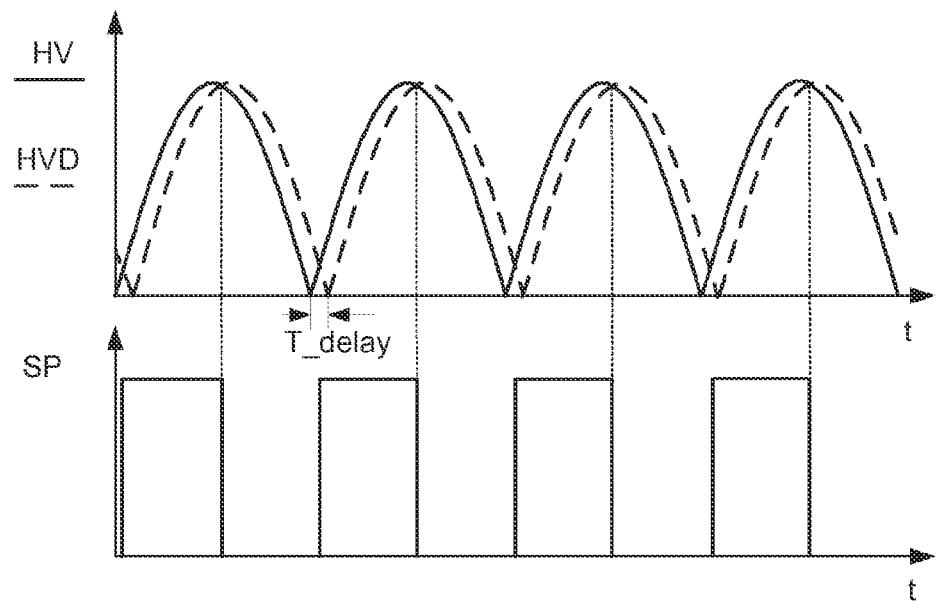
FIG. 3 illustrates an operative waveform diagram of the delay circuit 120 and the comparison circuit 130 shown in FIG. 2 in accordance with an embodiment of the present invention.

FIG. 3 illustrates an operative waveform diagram of the delay circuit 120 and the comparison circuit 130 shown in FIG. 2 in accordance with an embodiment of the present invention. The rectifier 110 rectifies the AC voltage $V_{IN}$ to provide the rectified signal HV shown in FIG. 3. The delay circuit 120 delays the rectified signal HV to provide the delayed rectified signal HVD. The comparison circuit 130 generates the square signal SP based on the comparison of the rectified signal HV and the delayed rectified signal HVD. When the rectified signal HV is larger than the delayed rectified signal HVD, the square signal SP is at high level; when the rectified signal HV is smaller than the delayed rectified signal HVD, the square signal is at low level. As shown in FIG. 3, the peak sampling instant is at every falling edge of the square signal SP. The sample output circuit 140 samples the rectified signal HV at every falling edge of the square signal SP and provides the peak sample signal HVP at its output terminal.

In one embodiment, the frequency of the AC voltage $V_{IN}$ is 50 Hz, the period of the rectified signal HV, and thus the period of the delayed rectified signal HVD, are both 10 ms, and the delay time T_delay of the delay circuit 120 is 100 μs. Persons of ordinary skill in the art will appreciate that the delay time T_delay of the delay circuit 120 is not limited to a certain value, the delay time T_delay of the delay circuit 120 may be other proper values. The shorter the delay time T_delay of the delay circuit 120, the more accurate the peak sampling instant. The peak value of the AC voltage $V_{IN}$ is sampled by using the delay circuit 120 and the comparison circuit 130 shown in FIG. 2. The structure of the peak sample circuit is simple and can be realized easily.

Figure 4:
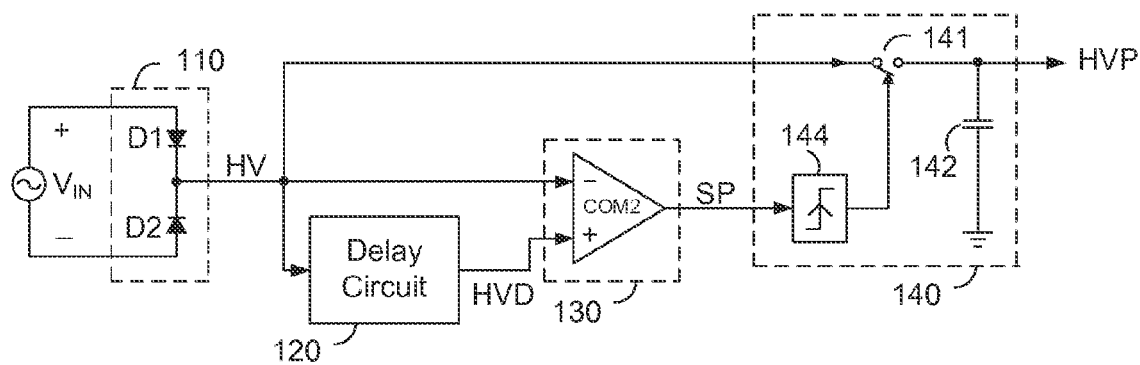
FIG. 4 illustrates a schematic circuit diagram of another peak sample circuit for AC voltage in accordance with another embodiment of the present invention.

FIG. 4 illustrates a schematic circuit diagram of another peak sample circuit for AC voltage in accordance with another embodiment of the present invention. The rectifier 110 and the delay circuit 120 shown in FIG. 4 are generally similar to that shown in FIG. 3. As a result, the similar description is omitted for clarity. The comparison circuit 130 comprises a comparator COM2. The comparator COM2 has a non-inverting input terminal, an inverting input terminal and an output terminal, wherein the non-inverting input terminal is coupled to the output terminal of the delay circuit 120 to receive the delayed rectified signal HVD, the inverting terminal is coupled to the output terminal of the rectifier 110 to receive the rectified signal HV. The comparator COM2 is configured to generate the square signal SP at the output terminal based on the comparison of the rectified signal HV and the delayed rectified signal HVD. In the embodiment shown in FIG. 4, when the rectified signal HV is larger than the delayed rectified signal HVD, the square signal SP is at low level; when the rectified signal HV is smaller than the delayed rectified signal HVD, the square signal SP is at high level. The peak sampling instant is at every rising edge of the square signal SP.

In the embodiment of FIG. 4, besides the output switch 141 and the output capacitor 142, the sample output circuit 140 further includes a rising-edge triggered circuit 144. The rising-edge triggered circuit 144 has an input terminal and an output terminal, wherein the input terminal is coupled to the output terminal of the comparison circuit 130 to receive the square signal SP, the output terminal is coupled to the control terminal of the output switch 141. The sample output circuit 140 samples the rectified signal HV at every rising edge of the square signal SP and provides the peak sample signal HVP at its output terminal.

Figure 5:
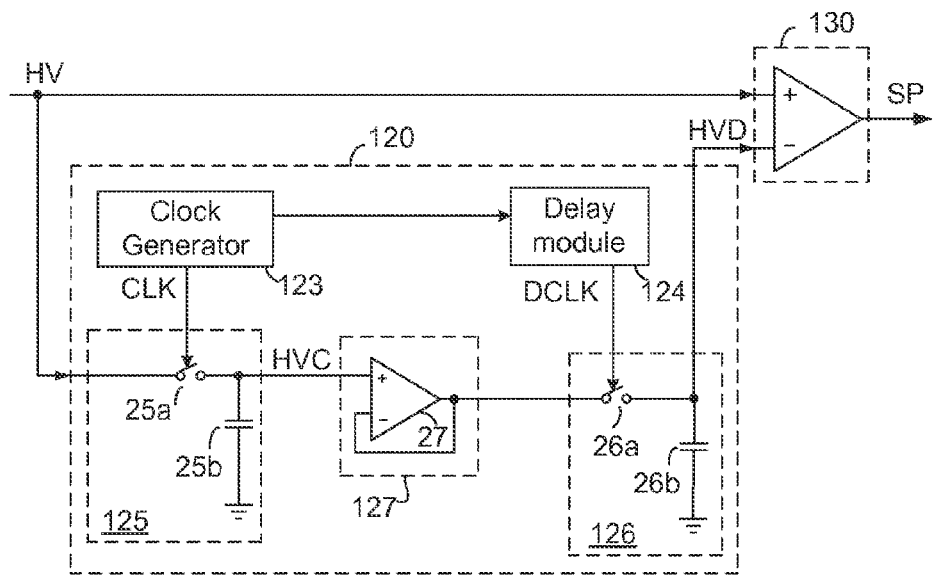
FIG. 5 illustrates a schematic circuit diagram of the delay circuit 120 and the comparison circuit 130 in accordance with another embodiment of the present invention.

FIG. 5 illustrates a schematic circuit diagram of the delay circuit 120 and the comparison circuit 130 in accordance with another embodiment of the present invention. The comparison circuit 130 shown in FIG. 5 is generally similar to that shown in FIG. 2. As a result, the similar description is omitted for clarity. The delay circuit 120 comprises a clock generator 123, a delay module 124, a first track and hold circuit 125 and a second track and hold circuit 126.

The clock generator 123 is configured to provide a periodic clock signal CLK. The delay module 124 has an input terminal and an output terminal, wherein the input terminal is configured to receive the clock signal CLK. The delay module 124 delays the clock signal CLK, and provides a delayed clock signal DCLK at its output terminal. To generate the delayed clock signal DCLK, the clock signal CLK is input into the delay module 124 and then the clock signal CLK is output at the output terminal as the delayed clock signal DCLK after a delay time TD. The delay time TD is less than the period of the clock signal CLK. The first track and hold circuit 125 has an input terminal, an output terminal and a control terminal, wherein the input terminal is coupled to the output terminal of the rectifier 110 to receive the rectified signal HV, the control terminal is coupled to the clock generator 123 to receive the clock signal CLK. The first track and hold circuit 125 tracks and holds the rectified signal HV based on the clock signal CLK and provides the rectified track signal HVC at its output terminal. The second track and hold circuit 126 has an input terminal, an output terminal and a control terminal, wherein the input terminal is coupled to the output terminal of the first track and hold circuit 125 to receive the rectified track signal HVC, the control terminal is coupled to the delay module 124 to receive the delayed clock signal DCLK. The second track and hold circuit 126 tracks and holds the rectified track signal HVC based on the delayed clock signal DCLK and provides the delayed rectified signal HVD at its output terminal.

In the embodiment of FIG. 4, the first track and hold circuit 125 comprises a first switch 25a and a first capacitor 25b. The first switch 25a has a first terminal, a second terminal and a control terminal, wherein the first terminal is configured to receive the rectified signal HV, the control terminal is configured to receive the clock signal CLK. The first capacitor 25b has a first terminal and a second terminal, wherein the first terminal is coupled to the second terminal of the first switch 25a, the second terminal is grounded. The clock signal CLK is provided to the control terminal of the first switch 25a. In the hold mode, the first switch 25a is open, which isolates the first capacitor 25b from the rectified signal HV and allows the first capacitor 25b to hold the rectified track signal HVC. In the track mode, the first switch 25a is closed thereby coupling the rectified signal HV to the first capacitor 25b to follow or track the rectified signal HV.

The second track and hold circuit 126 comprises a second switch 26a and a second capacitor 26b. The second switch 26a has a first terminal, a second terminal and a control terminal, wherein the first terminal is coupled to the output terminal of the first track and hold circuit 125 to receive the rectified track signal HVC, the control terminal is configured to receive the delayed clock signal DCLK. The second capacitor 26b has a first terminal and a second terminal, wherein the first terminal is coupled to the second terminal of the second switch 26a, the second terminal is grounded. The delayed clock signal DCLK is provided to the control terminal of the second switch 26a. In the hold mode, the second switch 26a is open, which isolates the second capacitor 26b from the rectified track signal HVC and allows the second capacitor 25b to hold the delayed rectified signal HVD. In the track mode, the second switch 26a is closed thereby coupling the rectified track signal HVC to the second capacitor 26b to follow or track the rectified track signal HVC.

In the embodiment shown in FIG. 5, the delay circuit 120 further comprises a buffer circuit 127 coupled between the output terminal of the first track and hold circuit 125 and the input terminal of the second track and hold circuit 126. The buffer circuit 127 is configured to isolate the second track and hold circuit 126 from the rectified track signal HVC. In one embodiment, the buffer circuit 127 comprises an operational amplifier 27. The operational amplifier 27 has a non-inverting terminal, an inverting terminal and an output terminal, wherein the non-inverting terminal is coupled to the output terminal of the first track and hold circuit 125, the inverting terminal and the output terminal are coupled to the input terminal of the second track and hold circuit 126.

Figure 6:
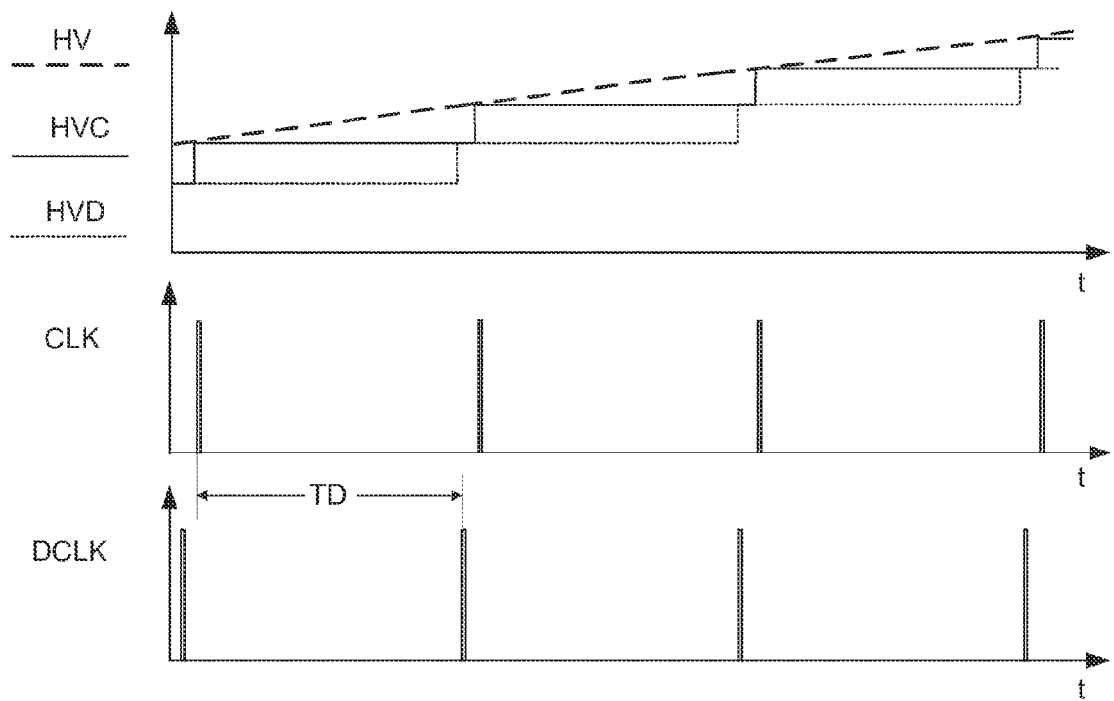
FIG. 6 illustrates an operative waveform diagram of the delay circuit 120 shown in FIG. 5 in accordance with an embodiment of the present invention.

FIG. 6 illustrates an operative waveform diagram of the delay circuit 120 shown in FIG. 5 in accordance with an embodiment of the present invention. As shown in FIG. 6, the delayed clock signal DCLK and the clock signal CLK has the same clock period.

The first track and hold circuit 125 tracks the amplitude of the rectified signal HV to get a rectified track signal HVC, and holds the rectified track signal HVC until the next clock cycle of the clock signal CLK. The second track and hold circuit 126 tracks the amplitude of the rectified track signal HVC to get a delayed rectified signal HVD, and holds the delayed rectified signal HVD until the next clock cycle of the delayed clock signal DCLK.

Figure 7:
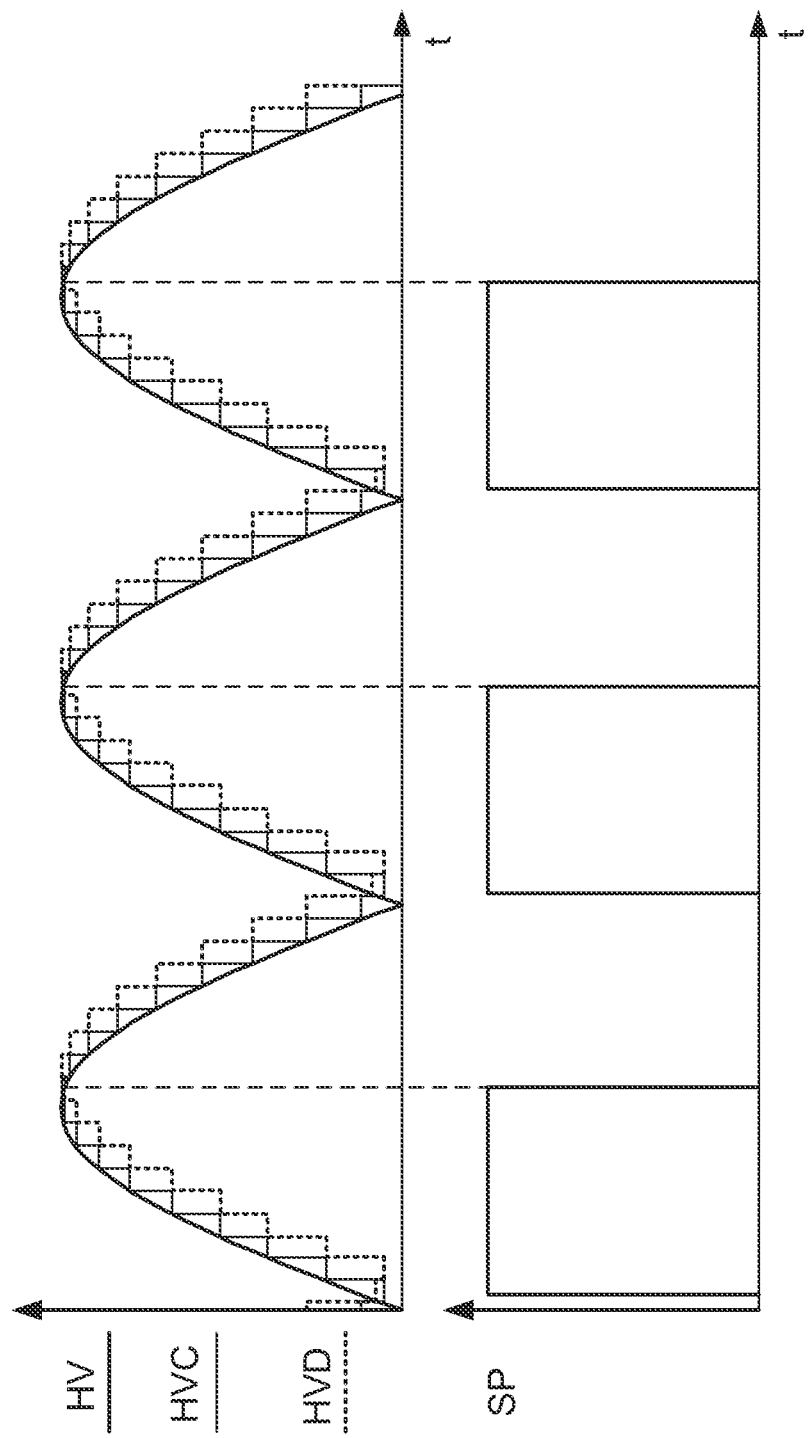
FIG. 7 illustrates an operative waveform diagram of the delay circuit 120 and the comparison circuit 130 shown in FIG. 5 in accordance with an embodiment of the present invention.

FIG. 7 illustrates an operative waveform diagram of the delay circuit 120 and the comparison circuit 130 shown in FIG. 5 in accordance with an embodiment of the present invention. The first track and hold circuit 125 periodically tracks and holds the rectified signal HV and provides the rectified track signal HVC shown in FIG. 7. The second track and hold circuit 126 periodically tracks and holds the rectified track signal HVC and provides the delayed rectified signal HVD shown in FIG. 7. The square signal SP is logical high when the rectified signal HV is larger than the delayed rectified signal HVD, and is logical low when the rectified signal HV is smaller than the delayed rectified signal HVD. In the embodiment, the peak sampling instant is at every falling edge of the square signal SP.

Figure 8:
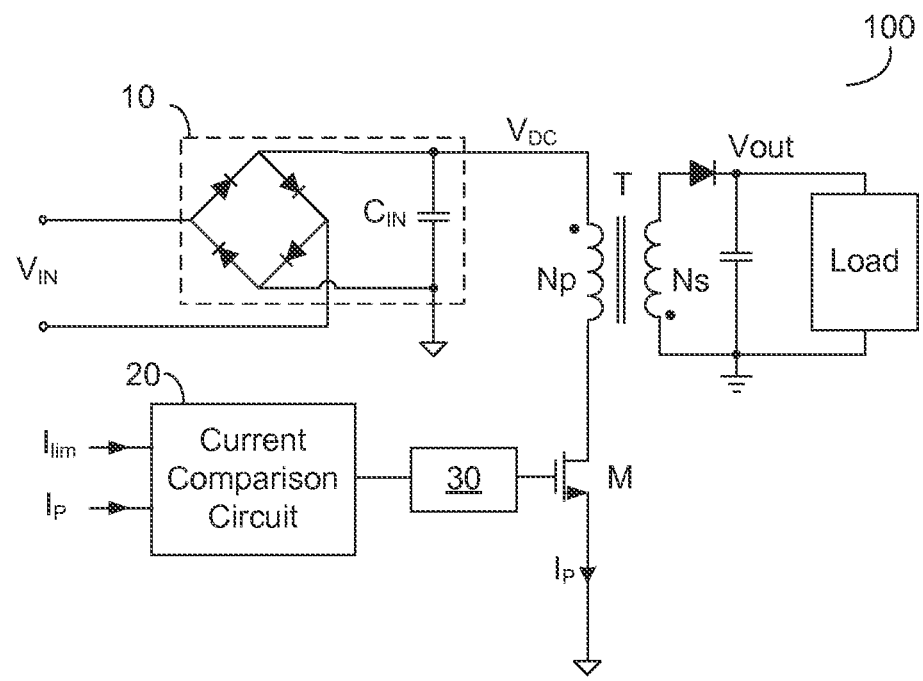
FIG. 8 illustrates a schematic circuit diagram of a peak current controlled switching converter 100 as a prior art.

The applications of the peak sample circuits of the embodiments will be described below with reference to FIGS. 8-10. FIG. 8 illustrates a schematic circuit diagram of a peak current controlled switching converter 100 as a prior art. The switching converter 100 comprises a rectifying and filtering circuit 10, a transformer T, a power switch M and a current comparison circuit 20. The rectifying and filtering circuit 10 has an input terminal and an output terminal, wherein the input terminal is configured to receive an AC voltage $V_{IN}$. The rectifying and filtering circuit 10 rectifies and filters the AC voltage $V_{IN}$ and provides a DC voltage $V_{DC}$ at the output terminal. The transformer T has a primary winding Np and a secondary winding Ns, wherein the primary winding Np is coupled to the output terminal of the rectifying and filtering circuit 10 to receive the DC voltage $V_{DC}$. The power switch M is coupled to the primary winding Np to control a primary current Ip flowing through the primary winding Np. The maximum output power provided by the switching converter 100 is clamped by limiting the primary current Ip. The current comparison circuit 20 is configured to turn off the power switch M through the circuit module 30 when the primary current Ip reaches a current limit $I_{lim}$. The circuit module 30 may comprise logic circuits and/or driving circuits. However, due to the effect of propagation delay, the power switch M can not be promptly turned off when the actual primary current Ip reaches the current $I_{lim}$.

Figure 9:
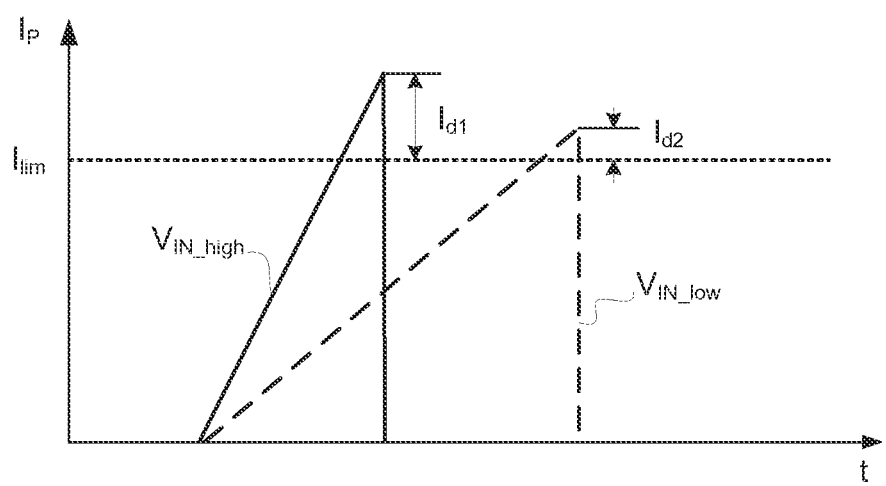
FIG. 9 illustrates the schematic waveform diagram of the primary current $I_P$ in different input voltage conditions as a prior art.

FIG. 9 illustrates the schematic waveform diagram of the primary current $I_P$ in different input voltage conditions as a prior art. $V_{IN\_high}$ is representative of the primary current in high input voltage condiction, $V_{IN\_low}$ is representative of the primary current in low input voltage condition. There is overshoot on the actual primary current Ip due to the propagation delay. The overshoot is associated with the input AC voltage $V_{IN}$. The higher the peak value of the AC voltage $V_{IN}$, the higher the overshoot of the primary current. Therefore, the output power of the switching converter with high input voltage is higher than that of the switching converter with low input voltage.

Figure 10:
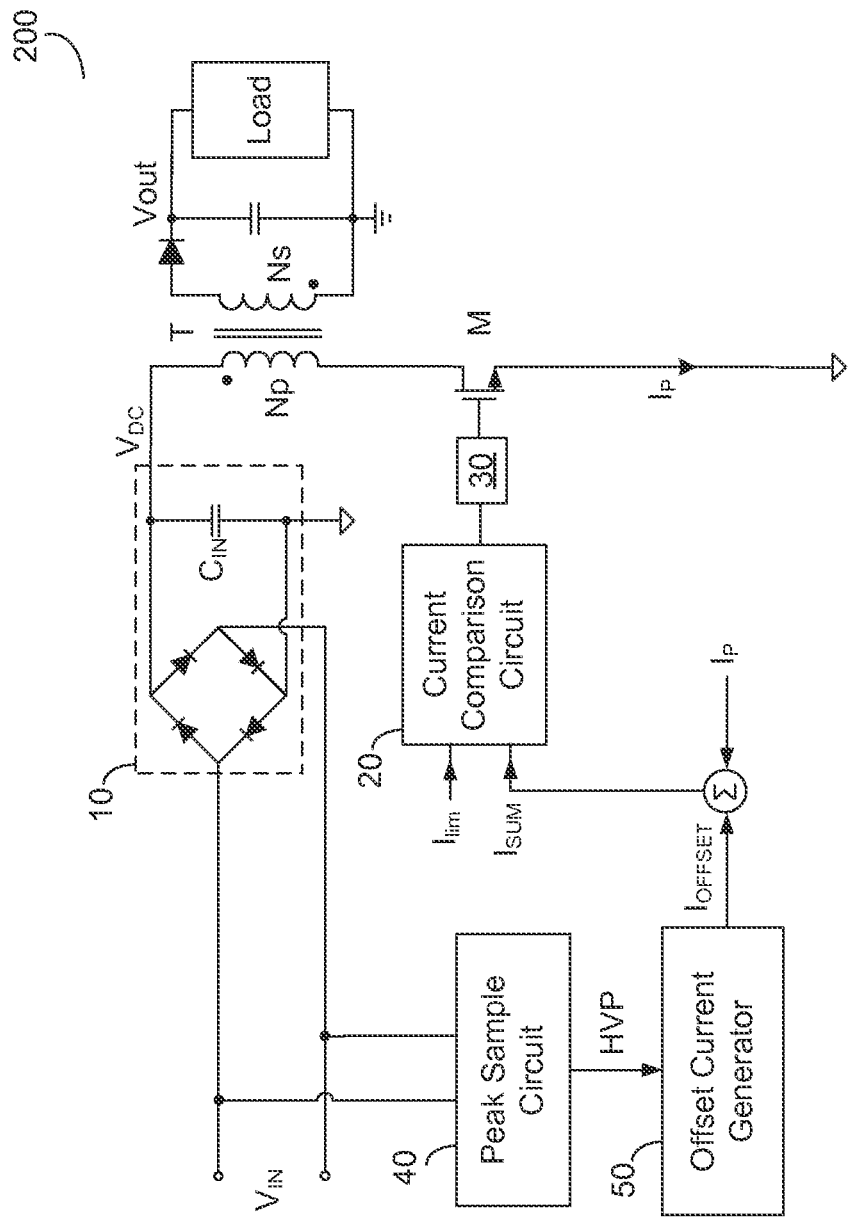
FIG. 10 illustrates a schematic circuit diagram of a switching converter 200 using the peak sample circuit for AC voltage in accordance with an embodiment of the present invention.

FIG. 10 illustrates a schematic circuit diagram of a switching converter 200 using the peak sample circuit for AC voltage in accordance with an embodiment of the present invention. To eliminate the overshoot of the primary current due to the propagation delay, the switching converter 200 further comprises a peak sample circuit 40 and an offset current generator 50 compared with the switching converter 100. The peak sample circuit 40 may be configured in the topologies as previously described. The peak sample circuit 40 has an input terminal and an output terminal, wherein the input terminal is configured to receive the AC voltage $V_{IN}$, and the output terminal is configured to provide a peak sample signal HVP representative of the peak value of the AC voltage $V_{IN}$. The offset current generator 50 has an input terminal and an output terminal, wherein the input terminal is coupled to the output terminal of the peak sample circuit 40 to receive the peak sample signal HVP. Based on the peak sample signal HVP, the offset current generator 50 provides an offset current $I_{OFFSET}$ at the output terminal. In one embodiment, the offset current generator 50 comprises a voltage-to-current conversion circuit. The offset current $I_{OFFSET}$ has a positive relationship with the peak sample signal HVP, which means that when the peak sample signal HVP increases, the offset current $I_{OFFSET}$ increases, and vice versa. In one embodiment, the offset current $I_{OFFSET}$ may be configured to have linearly positive relationship with the peak sample signal HVP. It is appreciated that in other embodiments the relationship between the offset current $I_{OFFSET}$ and the peak sample signal HVP could be non-linear or piecewise linear.

As shown in FIG. 10, $I_{SUM}$ is representative of the sum of the primary current Ip and the offset current $I_{OFFSET}$. The current comparison circuit 20 receives the current $I_{SUM}$ and the current limit $I_{lim}$ and compares $I_{SUM}$ with the current limit $I_{lim}$. The power switch M is turned off when the current $I_{SUM}$ reaches the current limit $I_{lim}$. When the switching converter 200 in FIG. 10 and the switching converter 100 of FIG. 8 receive the same AC voltage $V_{IN}$, because of the offset current $I_{OFFSET}$, the peak primary current of the switching converter 200 is smaller than that of the switching converter 100. Since the offset current $I_{OFFSET}$ has a positive relationship with the peak sample signal HVP, i.e. has a positive relationship with the peak value of AC voltage $V_{IN}$, when the peak value of AC voltage goes high, the offset current $I_{OFFSET}$ increases, the peak primary current decreases further. Persons of ordinary skill in the art will appreciate that the current comparison circuit 20 is not limited to receive the current $I_{SUM}$ and the current limit $I_{lim}$. In other embodiments, the current comparison circuit 20 could receive a current sensing signal representative of the current $I_{SUM}$ from a current sensing circuit and could compare the current sensing signal with a reference signal. Then the power switch is turned off when the current sensing signal reaches the reference signal.

Figure 11:
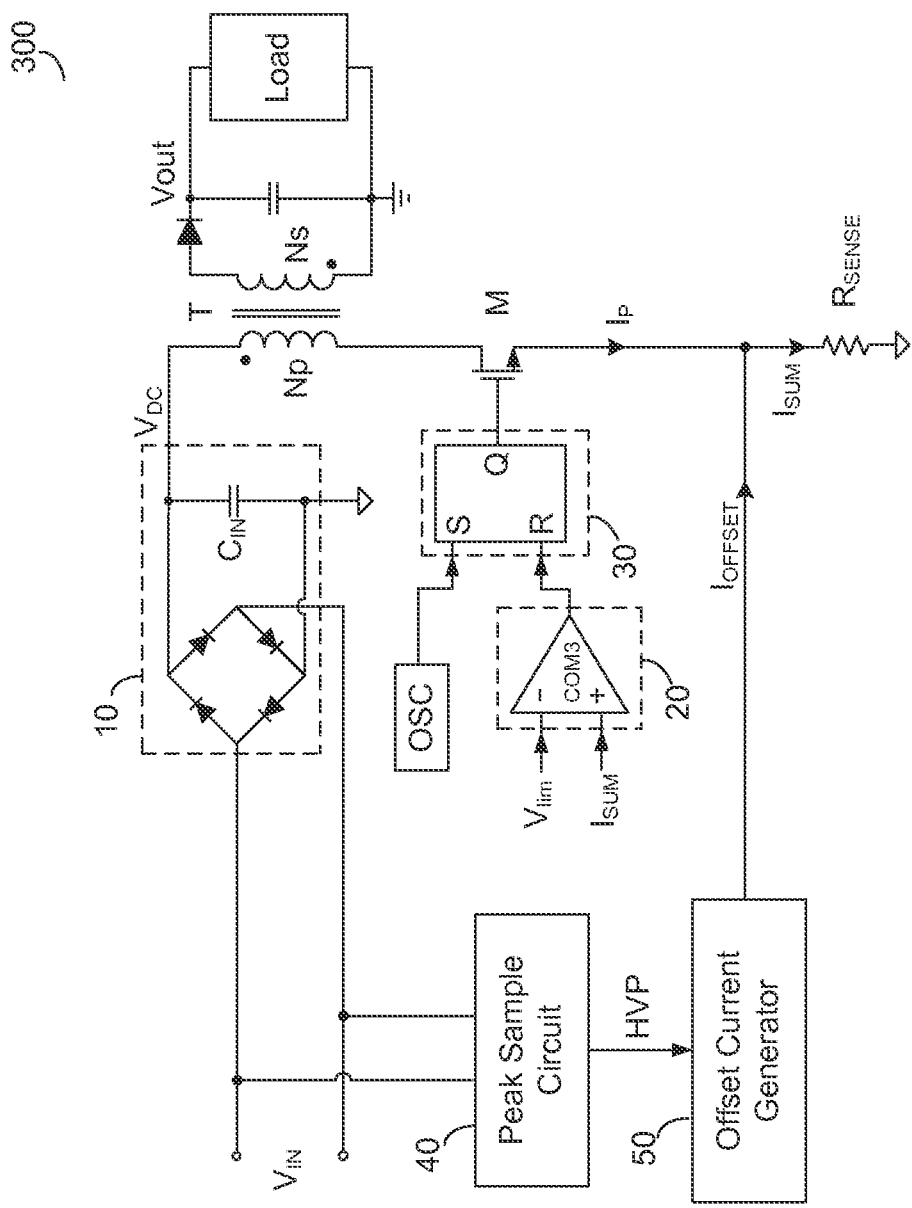
FIG. 11 illustrates a schematic circuit diagram of another switching converter 300 using the peak sample circuit for AC voltage in accordance with another embodiment of the present invention.

FIG. 11 illustrates a schematic circuit diagram of another switching converter 300 using the peak sample circuit for AC voltage in accordance with another embodiment of the present invention. The switching converter 300 comprises the rectifying and filtering circuit 10, the transformer T, the power switch M, the current comparison circuit 20, the circuit module 30, the peak sample circuit 40 and the offset current generator 50 as described above. In the embodiment of FIG. 11, the switching converter 300 further comprises a current sensing resistor $R_{SENSE}$. The current sensing resistor $R_{SENSE}$ is series coupled to the power switch M and has a first terminal and a second terminal, wherein the first terminal is coupled to the output terminal of the offset current generator 50 and the power switch M, the second terminal is coupled to the primary reference ground. As shown in FIG. 11, the current $I_{SUM}$ flowing through the current sensing resistor $R_{SENSE}$ is the sum of the primary current Ip and the offset current $I_{OFFSET}$. In the embodiment of FIG. 11, the current comparison circuit 20 comprises a comparator COM3, the circuit module 30 comprises a flip-flop. When the current $I_{SUM}$ reaches the current limit $I_{lim}$, the flip-flop is reset and the power switch M is turned off until the next cycle of an oscillator OSC. Persons of ordinary skill in the art will appreciate that in other embodiments the current comparison circuit 20 and the circuit, module 30 could comprise other suitable structure.

Figure 12:
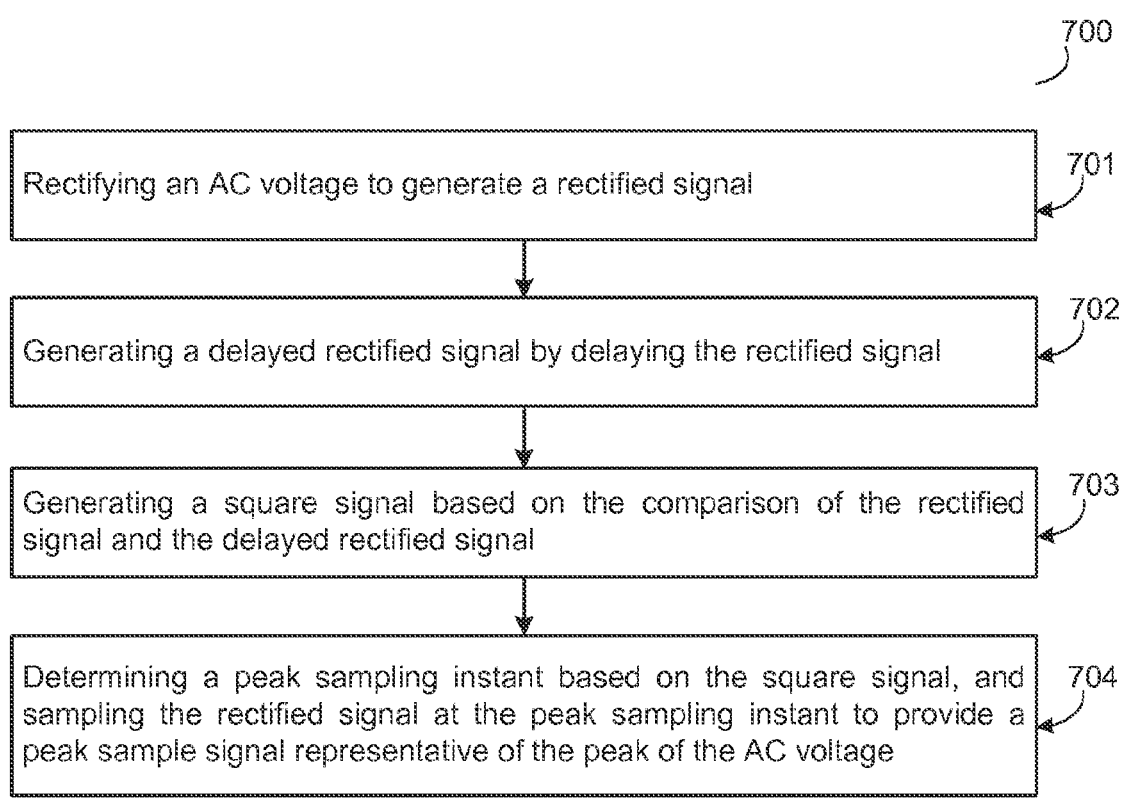
FIG. 12 is a process flow diagram of a peak sample method 700 for AC voltage in accordance with an embodiment of the present invention.

FIG. 12 is a process flow diagram of a peak sample method 700 for AC voltage in accordance with an embodiment of the present invention. The method 700 comprises steps S701~S704.

At step S701, an AC voltage is rectified and a rectified signal is generated.

At step S702, a delayed rectified signal is generated by delaying the rectified signal.

At step S703, the rectified signal and the delayed rectified signal are compared and a square signal is generated.

At step S704, a peak sampling instant is determined by the square signal, the rectified signal is sampled at the peak sampling instant to generate a peak sample signal representative of the peak value of the AC voltage.

In one embodiment, the step 702 comprises: generating a clock signal; delaying a clock signal to generate a delayed clock signal; based the clock signal, tracking and holding the rectified signal to generate a rectified track signal; based on the delayed clock signal, tracking and holding the rectified track signal to generate a delayed rectified signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A peak sample circuit for AC voltage, the peak sample circuit comprising:
    a rectifier having a first input terminal, a second input terminal and an output terminal, wherein the first input terminal and the second input terminal are coupled to receive an AC voltage, the rectifier rectifies the AC voltage and provides a rectified signal at the output terminal;
    a delay circuit having an input terminal and an output terminal, wherein the input terminal is coupled to the output terminal of the rectifier to receive the rectified signal, the delay circuit delays the rectified signal and provides a delayed rectified signal at the output terminal;
    a comparison circuit having a first input terminal, a second input terminal and an output terminal, wherein the first input terminal is coupled to the output terminal of the rectifier to receive the rectified signal, the second input terminal is coupled to the output terminal of the delay circuit to receive the delayed rectified signal, the comparison circuit compares the rectified signal with the delayed rectified signal and provides a square signal at the output terminal; and
    a sample output circuit has an input terminal, an output terminal and a control terminal, wherein the input terminal is coupled to the output terminal of the rectifier to receive the rectified signal, the control terminal is coupled to the output terminal of the comparison circuit to receive the square signal, the sample output circuit samples the rectified signal based on the square signal and provides a peak sample signal representative of the peak value of the AC voltage at the output terminal.

2. The peak sample circuit of claim 1, wherein the delay circuit comprises:
    a delay resistor having a first terminal and a second terminal, wherein the first terminal is coupled to the output terminal of the rectifier, the second terminal is coupled to the second input terminal of the comparison circuit; and
    a delay capacitor having a first terminal and a second terminal, wherein the first terminal is coupled to the second terminal of the delay resistor, the second terminal is grounded.

3. The peak sample circuit of claim 1, wherein the delay circuit comprises:
    a clock generator configured to provide a periodic clock signal;
    a delay module having an input terminal and an output terminal, wherein the input terminal is configured to receive the clock signal, the delay module delays the clock signal and provides a delayed clock signal at the output terminal;
    a first track and hold circuit having an input terminal, an output terminal and a control terminal, wherein the input terminal is coupled to the output terminal of the rectifier to receive the rectified signal, the control terminal is coupled to the clock generator to receive the clock signal, the first track and hold circuit tracks and holds the rectified signal based on the clock signal and provides a rectified track signal at the output terminal; and
    a second track and hold circuit having an input terminal, an output terminal and a control terminal, wherein the input terminal is coupled to the output terminal of the first track and hold circuit to receive the rectified track signal, the control terminal is coupled to the output terminal of the delay module to receive the delayed clock signal, the second track and hold circuit tracks and holds the rectified track signal based on the delayed clock signal and provides a delayed rectified signal at the output terminal.

4. The peak sample circuit of claim 3, wherein the first track and hold circuit comprises:
    a first switch having a first terminal, a second terminal and a control terminal, wherein the first terminal is coupled to the output terminal of the rectifier to receive the rectified signal, the control terminal is coupled to the clock generator to receive the clock signal; and
    a first capacitor having a first terminal and a second terminal, wherein the first terminal is coupled to the second terminal of the first switch, the second terminal is grounded.

5. The peak sample circuit of claim 3, wherein the second track and hold circuit comprises:
    a second switch having a first terminal, a second terminal and a control terminal, wherein the first terminal is coupled to the output terminal of the first track and hold circuit to receive the rectified track signal, the control terminal is coupled to the output terminal of the delay module to receive the delayed clock signal; and
    a second capacitor having a first terminal and a second terminal, wherein the first terminal is coupled to the second terminal of the second switch, the second terminal is grounded.

6. The peak sample circuit of claim 3, wherein the delay circuit further comprises a buffer circuit coupled between the first track and hold circuit and the second track and hold circuit.

7. The peak sample circuit of claim 1, wherein the sample output circuit comprises:
    an output switch having a first terminal, a second terminal and a control terminal, wherein the first terminal is coupled to the output terminal of the rectifier to receive the rectified signal, the control terminal is coupled to the output terminal of the comparison circuit to receive the square signal; and an output capacitor having a first terminal and a second terminal, wherein the first terminal is coupled to the second terminal of the output switch, the second terminal is grounded.

8. A switching converter using a peak sample circuit for AC voltage, the switching converter comprising:
a rectifying and filtering circuit configured to rectify and filter an AC voltage and to provide a DC voltage;
a transformer having a primary winding and a secondary winding, wherein the primary winding is coupled to the rectifying and filtering circuit to receive the DC voltage;
a power switch electrically coupled to the primary winding to control a primary current flowing through the primary winding;
the peak sample circuit configured to receive the AC voltage and to provide a peak sample signal representative of the peak value of the AC voltage;
an offset current generator coupled to the peak sample circuit to receive the peak sample signal, wherein the offset current generator is configured to provide an offset current based on the peak sample signal; and
a current comparison circuit configured to compare the sum of the primary current and the offset current with a current limit, wherein the power switch is turned off when the sum of the primary current and the offset current reaches the current limit;
wherein the peak sample circuit comprises:
a rectifier having a first input terminal, a second input terminal and an output terminal, wherein the first input terminal and the second input terminal are coupled to receive the AC voltage, the rectifier rectifies the AC voltage and provides a rectified signal at the output terminal;
a delay circuit having an input terminal and an output terminal, wherein the input terminal is coupled to the output terminal of the rectifier to receive the rectified signal, the delay circuit delays the rectified signal and provides a delayed rectified signal at the output terminal;
a comparison circuit having a first input terminal, a second input terminal and an output terminal, wherein the first input terminal is coupled to the output terminal of the rectifier to receive the rectified signal, the second input terminal is coupled to the output terminal of the delay circuit to receive the delayed rectified signal, the comparison circuit compares the rectified signal with delayed rectified signal and provides a square signal at the output terminal; and
a sample output circuit has an input terminal, an output terminal and a control terminal, wherein the input terminal is coupled to the output terminal of the rectifier to receive the rectified signal, the control terminal is couple to the output terminal of the comparison circuit to receive the square signal, the sample output circuit samples the rectified signal based on the square signal and provides the peak sample signal representative of the peak value of the AC voltage at the output terminal.

9. The switching converter of claim 8, wherein the delay circuit comprises:
a delay resistor having a first terminal and a second terminal, wherein the first terminal is coupled to the output terminal of the rectifier, the second terminal is coupled to the second input terminal of the comparison circuit; and
a delay capacitor having a first terminal and a second terminal, wherein the first terminal is coupled to the second terminal of the delay resistor, the second terminal is grounded.

10. The switching converter of claim 8, wherein the delay circuit comprises:
a clock generator configured to provide a periodic clock signal;
a delay module having an input terminal and an output terminal, wherein the input terminal is configured to receive the clock signal, the delay module delays the clock signal and provides a delayed clock signal at the output terminal;
a first track and hold circuit having an input terminal, an output terminal and a control terminal, wherein the input terminal is coupled to the output terminal of the rectifier to receive the rectified signal, the control terminal is coupled to the clock generator to receive the clock signal, the first track and hold circuit tracks and holds the rectified signal based on the clock signal and provides a rectified track signal; and
a second track and hold circuit having an input terminal, an output terminal and a control terminal, wherein the input terminal is coupled to the output terminal of the first track and hold circuit to receive the rectified track signal, the control terminal is coupled to the output terminal of the delay module to receive the delayed clock signal, the second track and hold circuit tracks and holds the rectified track signal based on the delayed clock signal and provides a delayed rectified signal.

11. The switching converter of claim 10, wherein the first track and hold circuit comprises:
a first switch having a first terminal, a second terminal and a control terminal, wherein the first terminal is coupled to the output terminal of the rectifier to receive the rectified signal, the control terminal is coupled to the clock generator to receive the clock signal; and
a first capacitor having a first terminal and a second terminal, wherein the first terminal is coupled to the second terminal of the first switch, the second terminal is grounded.

12. The switching converter of claim 10, wherein the second track and hold circuit comprises:
a second switch having a first terminal, a second terminal and a control terminal, wherein the first terminal is coupled to the output terminal of the rectifier to receive the rectified track signal, the control terminal is coupled to the output terminal of the delay module to receive the delayed clock signal; and
a second capacitor having a first terminal and a second terminal, wherein the first terminal is coupled to the second terminal of the second switch, the second terminal is grounded.

13. The switching converter of claim 10, wherein the delay circuit further comprises a buffer circuit coupled between the first track and hold circuit and the second track and hold circuit and configured to isolate the rectified track signal.

14. The switching converter of claim 8, wherein the sample output circuit comprises:
an output switch having a first terminal, a second terminal and a control terminal, wherein the first terminal is coupled to the output terminal of the rectifier to receive the rectified signal, the control terminal is coupled to the output terminal of the comparison circuit to receive the square signal; and an output capacitor having a first terminal and a second terminal, wherein the first terminal is coupled to the second terminal of the output switch, the second terminal is grounded.

15. The switching converter of claim 8, further comprising a current sensing resistor having a first terminal and a second terminal, wherein the first terminal is coupled to the output terminal of the offset current generator and the power switch, the second terminal is coupled to the primary reference ground.

16. A peak sample method for AC voltage, the peak sample method comprising:
rectifying an AC voltage to generate a rectified signal;
generating a delayed rectified signal by delaying the rectified signal;
generating a square signal based on the comparison of the rectified signal and the delayed rectified signal; and
determining a peak sampling instant based on the square signal, and sampling the rectified signal at the peak sampling instant to provide a peak sample signal representative of the peak value of the AC voltage.

17. The peak sample method of claim 16, wherein delaying the rectified signal comprises:
generating a periodic clock signal;
delaying the clock signal to generate a delayed clock signal;
tracking and holding the rectified signal based on the clock signal to generate a rectified track signal;
tracking and holding the rectified track signal based on the delayed clock signal to generate a delayed rectified signal.

\* \* \* \* \*